United States Patent [19]

Gearin et al.

[11] Patent Number: 4,768,916
[45] Date of Patent: Sep. 6, 1988

[54] COLLAPSIBLE FRAME SYSTEM FOR LOADING MOTOR VEHICLES INTO STANDARD CARGO-CARRYING ENCLOSURES

[75] Inventors: Peter Gearin, Portland; Everett A. Leech, Clackamas, both of Oreg.

[73] Assignee: G & G Intellectual Properties, Inc., Portland, Oreg.

[21] Appl. No.: 40,469

[22] Filed: Apr. 20, 1987

Related U.S. Application Data

[63] Continuation-in-part of Ser. No. 943,688, Dec. 18, 1986.

[51] Int. Cl.⁴ .................. B60P 1/64; B65D 88/12; B65D 88/52
[52] U.S. Cl. .................. 414/498; 211/195; 410/9; 410/16; 410/18; 414/786
[58] Field of Search .......... 414/341, 343, 345, 352, 414/353, 389, 390, 395, 398–400, 495, 496, 498–500, 585, 679, 542, 786; 410/3, 4, 7–9, 13, 14, 16, 18, 24–26, 29.1, 30; 211/162, 175, 186, 195, 201, 189; 296/1 A

[56] References Cited

U.S. PATENT DOCUMENTS

| | | | |
|---|---|---|---|
| 982,046 | 1/1911 | Flemming | 410/30 X |
| 1,276,556 | 8/1918 | Michod | 410/25 |
| 1,282,766 | 10/1918 | Daly | 410/25 X |
| 1,724,556 | 8/1929 | Blakely | 410/9 X |
| 1,869,054 | 7/1932 | Evans | 410/18 |
| 2,084,661 | 6/1937 | Wagstaff | 211/201 X |
| 2,968,260 | 1/1961 | Scheldrup | 410/3 |
| 2,969,157 | 1/1961 | Panes | 414/542 |
| 3,040,917 | 6/1962 | Bonnin | 414/542 X |
| 3,043,454 | 7/1964 | Butler et al. | 414/679 |
| 3,147,868 | 9/1966 | Borger et al. | 414/343 |
| 3,236,400 | 2/1966 | Turturro et al. | 414/542 |
| 3,260,385 | 7/1966 | King | 414/395 |
| 3,445,013 | 5/1969 | Scheinert | 410/26 X |
| 3,490,622 | 1/1970 | Brackin | 414/341 X |
| 3,667,635 | 6/1972 | Hackney | 414/498 |
| 4,016,991 | 4/1977 | Oldford | 414/400 |
| 4,124,119 | 11/1978 | Nordstrom | 410/13 X |
| 4,297,071 | 10/1981 | Dunbar | 414/542 |
| 4,545,710 | 10/1985 | Hepp | 414/498 X |
| 4,668,141 | 5/1987 | Petersen | 410/13 X |

FOREIGN PATENT DOCUMENTS

| | | | |
|---|---|---|---|
| 2049653 | 4/1972 | Fed. Rep. of Germany | 410/4 |
| 8101997 | 7/1981 | World Int. Prop. O. | 410/24 |

Primary Examiner—Robert J. Spar
Assistant Examiner—David A. Bucci
Attorney, Agent, or Firm—Chernoff, Vilhauer, McClung & Stenzel

[57] ABSTRACT

A method and apparatus are provided for loading motor vehicles into a standard cargo-carrying enclosure, such as a container or van, for transport therein. The vehicles are loaded onto a frame exterior of the enclosure so as to be supported therby in multiple columns of vertically-spaced vehicles in end-to-end relation to one another. Thereafter the frame and vertically-spaced vehicles are inserted in unison matingly into the cargo-carrying enclosure for transport to a destination where the frame and vehicles are withdrawn from the enclosure for unloading purposes. Positioning of the vehicles on the frame prior to insertion into the container is accmplished by a powered gantry which successively detachably engages each of a plurality of different vehicle-support assemblies and lifts them and their associated vehicles separately relative to the frame into elevated positions where the support assemblies are retained against downward movement by locking to the frame. During insertion into the cargo-carrying enclosure, the frame is separated from the gantry.

6 Claims, 8 Drawing Sheets

COLLAPSIBLE FRAME SYSTEM FOR LOADING MOTOR VEHICLES INTO STANDARD CARGO-CARRYING ENCLOSURES

This application is a continuation-in-part of U.S. patent application Ser. No. 943,688 filed Dec. 18, 1986.

BACKGROUND OF THE INVENTION

This invention relates to the loading of motor vehicles into standard cargo-carrying enclosures, such as containers or vans, for transport therein. More particularly, the invention relates to the loading of such motor vehicles into such enclosures in multiple columns of vertically-spaced vehicles arranged substantially end-to-end relative to one another.

It has been common to transport motor vehicles, such as passenger cars and small trucks, in vertically-spaced groups or columns arranged substantially end-to-end. For example, conventional open highway trailers such as those shown in Baker U.S. Pat. No. 2,492,829 or British Patent No. 1,006,496 have frames with vertically-adjustable vehicle support assemblies onto which the vehicles are driven and then raised to elevated positions by hydraulic jacks integrally mounted on the trailer frame. Alternatively, enclosures such as highway vans and rail cars have been equipped with integral vehicle-support assemblies within the enclosure for supporting vehicles in vertically-spaced groups such as shown, for example, in Hice U.S. Pat. No. 2,016,430, Linquist et al. U.S. Pat. No. 1,247,553, Gutridge U.S. Pat. No. 3,498,480, Canadian Pat. No. 961,699 and French Patent No. 1,202,387.

The problems with all such structures are primarily twofold. First, vehicle-carrying structures having integral vehicle-support assemblies are not readily adaptable to transport goods other than vehicles and therefore cannot be efficiently utilized for the transport of other cargo on return trips after the delivery of the vehicles. Second, in enclosing structures having integral vehicle supports therein, it is most difficult to arrange the vehicles compactly within the enclosure because room is needed inside the enclosure for workmen to maneuver so as to properly secure the vehicles in vertically-spaced relationships. When this difficulty is avoided by dispensing with the enclosure, as in the conventional vehicle highway trailers, the lack of an enclosure exposes the vehicles to weather and road hazards and thus to damage.

Partly in answer to the foregoing problems, enclosed vehicle-transporting vans as shown in Smith U.S. Pat. Nos. 4,455,119 and 4,597,712, respectively, have been developed. However the continuing requirement that each van have its own integal vehicle-supporting structure makes each van inordinately expensive. Moreover the further continuing requirement, that the positioning of the vehicles in vertically-spaced relation to each other take place inside the van, perpetuates the difficulty of securing each vehicle within a relatively inaccesible space.

What is needed, therefore, is an economical system for loading motor vehicles in vertically-spaced relation to each other within an enclosure for transport therein which does not require the enclosure to have any special integral vehicle-supporting structure, so that both its cost and its obstructions to the handling of other types of cargo are minimized, and which does not require any individual positioning or securing of the vehicles while in the enclosure.

SUMMARY OF THE INVENTION

The present invention overcomes the above-described deficiencies of the prior art by readily adapting standard cargo-carrying enclosures, such as containers and highway vans, to transport motor vehicles in columns of vertically-spaced vehicles arranged generally end-to-end. The invention accomplishes this by providing a frame insertable into the cargo-carrying enclosure having a vehicle-supporting structure upon which vehicles can be positioned and secured in vertically-spaced relation to one another while exterior of the enclosure. Thereafter, the entire frame with its vehicles already supported and secured thereon can be inserted as a unit into the enclosure for transport therein. This system permits the vehicles to be arranged in a compact configuration while maintaining easy access for positioning and securing of the vehicles.

At the vehicles' destination, unloading of the enclosure is equally facilitated by the ability of the entire frame simply to be withdrawn from the enclosure in unison with the vehicles mounted thereon. Once exterior of the enclosure, the vehicles are all easily accessible for demounting and removal from the frame. The empty frame may then be reinserted into the enclosure and, because it is a type of frame requiring no interior structure when empty, its open interior space may be loaded with other types of cargo for the return trip. Such interior space is very nearly as large as the interior space of the cargo-carrying enclosure itself because of the mating insertable fit of the sides of the frame within the enclosure.

Even though the frame has multiple vehicle-support assemblies for elevating the vehicles, economy of the frame is enhanced by making it unnecessary for each vehicle-support assembly to have an integral powered lifting mechanism. Instead, powered lifting apparatus is provided which detachably engages each vehicle-support assembly separately to raise it, and its associated vehicle, into an elevated position. Thereafter, the support assembly is restrained against downward movement, after disengagement of the lifting apparatus, by locking to the frame. The lifting apparatus is movable with respect to the frame horizontally from support assembly to support assembly so as to be able to engage each individually. Preferably the lifting apparatus is separable from the frame, upon insertion of the frame into the cargo-carrying enclosure, so that the lifting apparatus can be used for elevating vehicles on subsequent frames.

In order to maximize the versatility of the frame for compact carrying of vehicles of different sizes, each vehicle support assembly is not only liftable to a height independent of any other support assembly, but is free of any structure extending between its front wheel-engaging surfaces and its rear wheel-engaging surfaces so that the top of an underlying vehicle may encroach upon the longitudinal space between the front and rear wheels of an upper vehicle. The vehicle-support assemblies are also able to tilt the vehicles at any angle by virtue of the ability of the lifting apparatus to raise the forward and rear extremities of each vehicle-support assembly by respective distances independent of each other.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

GENERAL DESCRIPTION

Figure 1:
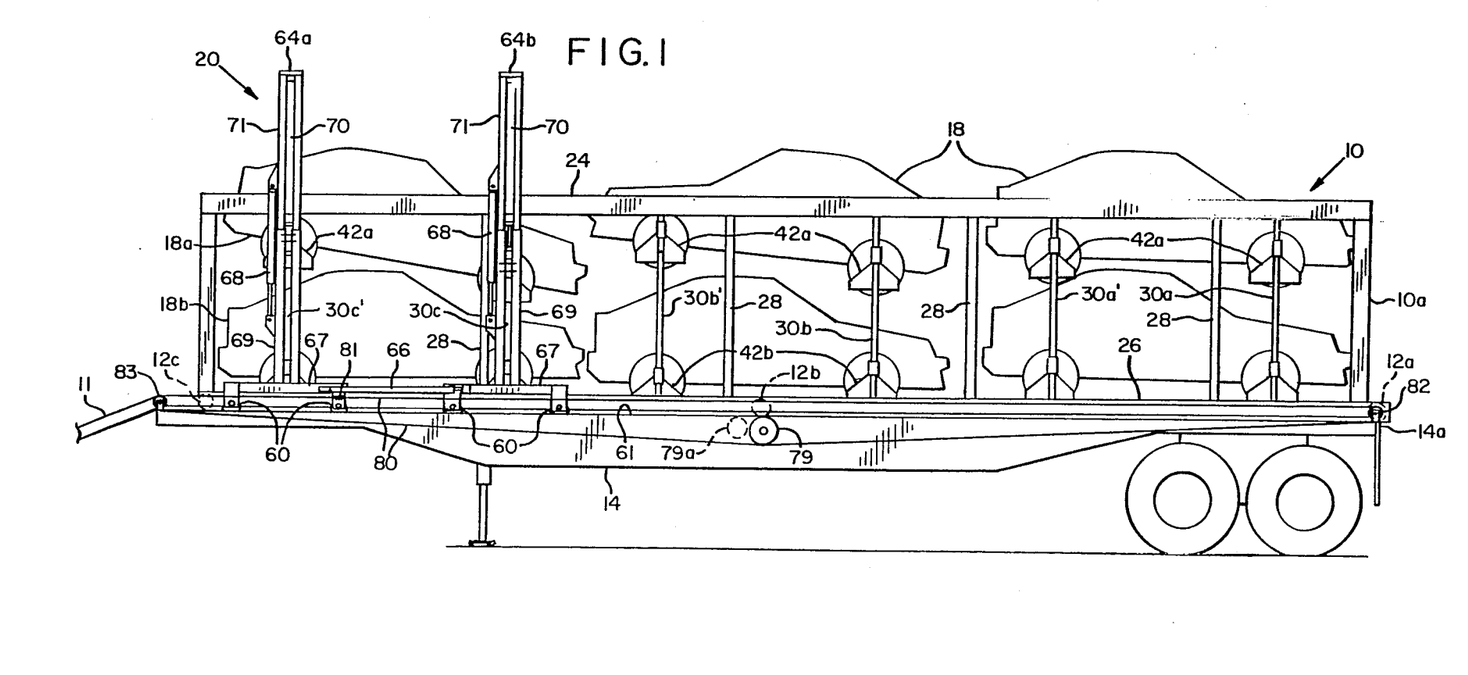
FIG. 1 is a side view of an exemplary embodiment of an insertable, vehicle-carrying frame constructed in accordance with the present invention, shown supported on a modified flatbed trailer having a gantry assembly for loading of the vehicles onto the frame.
Figure 2:
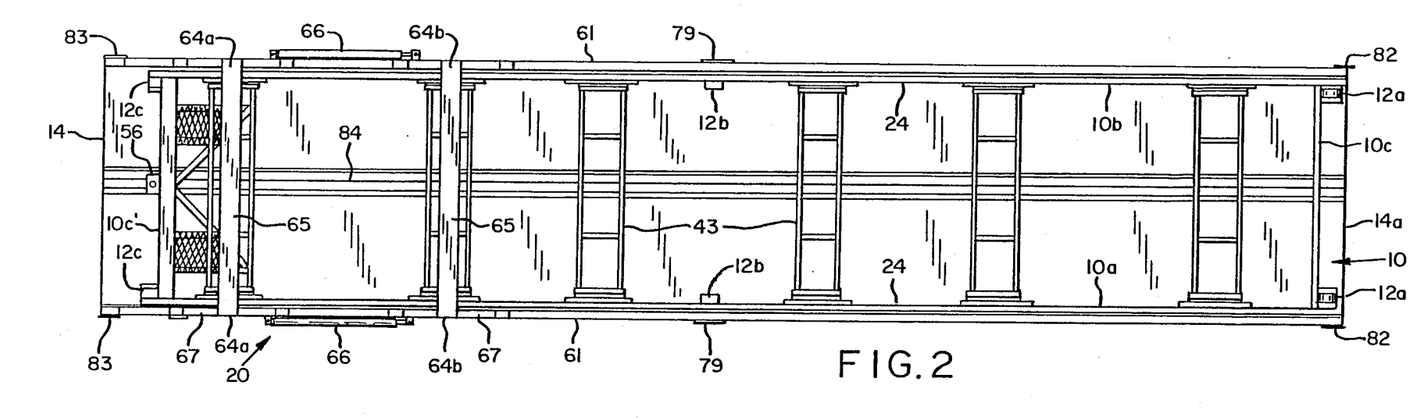
FIG. 2 is a top view of the frame, trailer and gantry assembly of FIG. 1 with the vehicles removed to show the frame structure.
Figure 3:
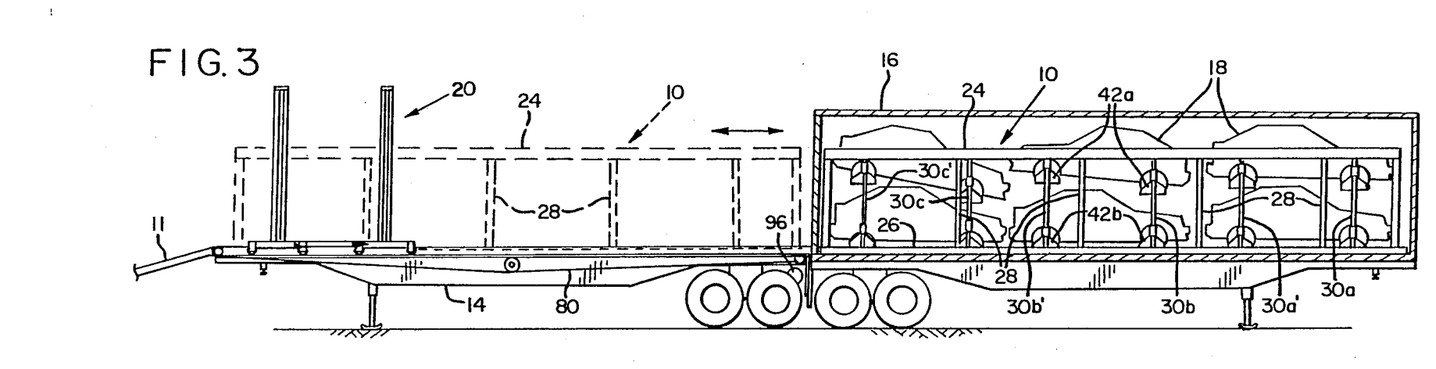
FIG. 3 is a partially sectional side view showing the trailer and gantry assembly of FIG. 1 in relation to a standard, cargo-carrying container into which the frame and its supported vehicles have been inserted.

With reference to FIGS. 1-3, a vehicle-supporting frame 10 is supported by rollers 12a, 12b, 12c atop a suitable frame-supporting structure, such as a modified flatbed trailer 14. The open end of an empty cargo-carrying enclosure, such as a container 16 (FIG. 3), is aligned with the end 14a of the trailer 14 at the same level as the bed of the trailer so that the frame 10 can be rolled longitudinally from the trailer into the container. In order to ship motor vehicles such as 18 in the container, they are first loaded onto the frame 10 by driving them up a ramp 11 into the frame while it is exterior of the container, some of the vehicles being elevated into vertically-spaced relation above other vehicles so as to be supported on the frame 10 roughly in columns of two or more arranged end-to-end. Elevating of the motor vehicles on the frame 10 is accomplished by a powered lifting apparatus or gantry 20 movably mounted on the trailer 14 and separable from the frame 10 when the frame is ultimately inserted into the container 16.

The Insertable Frame

Figure 4:
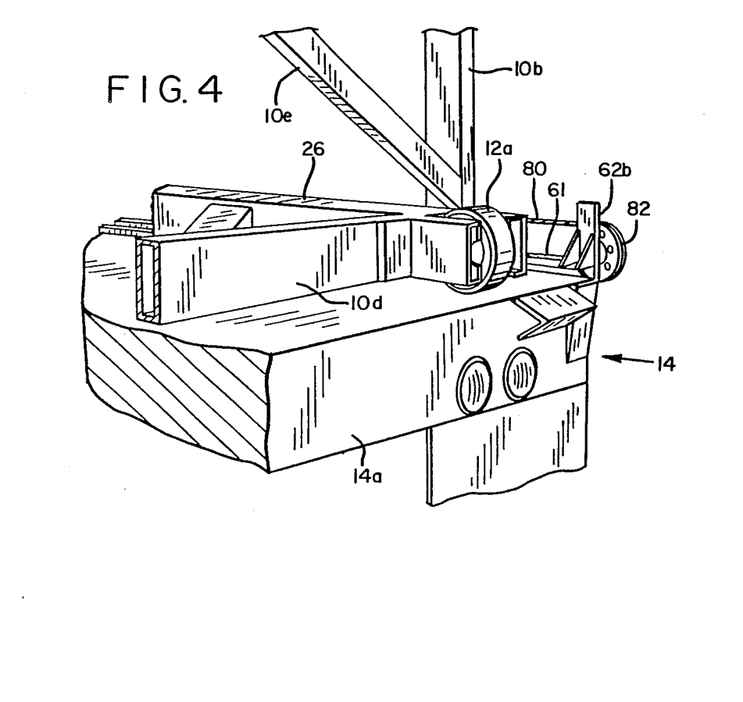
FIG. 4 is an enlarged, perspective exterior view of a portion of the end of the trailer and frame positioned closest to the cargo-carrying container.
Figure 5:
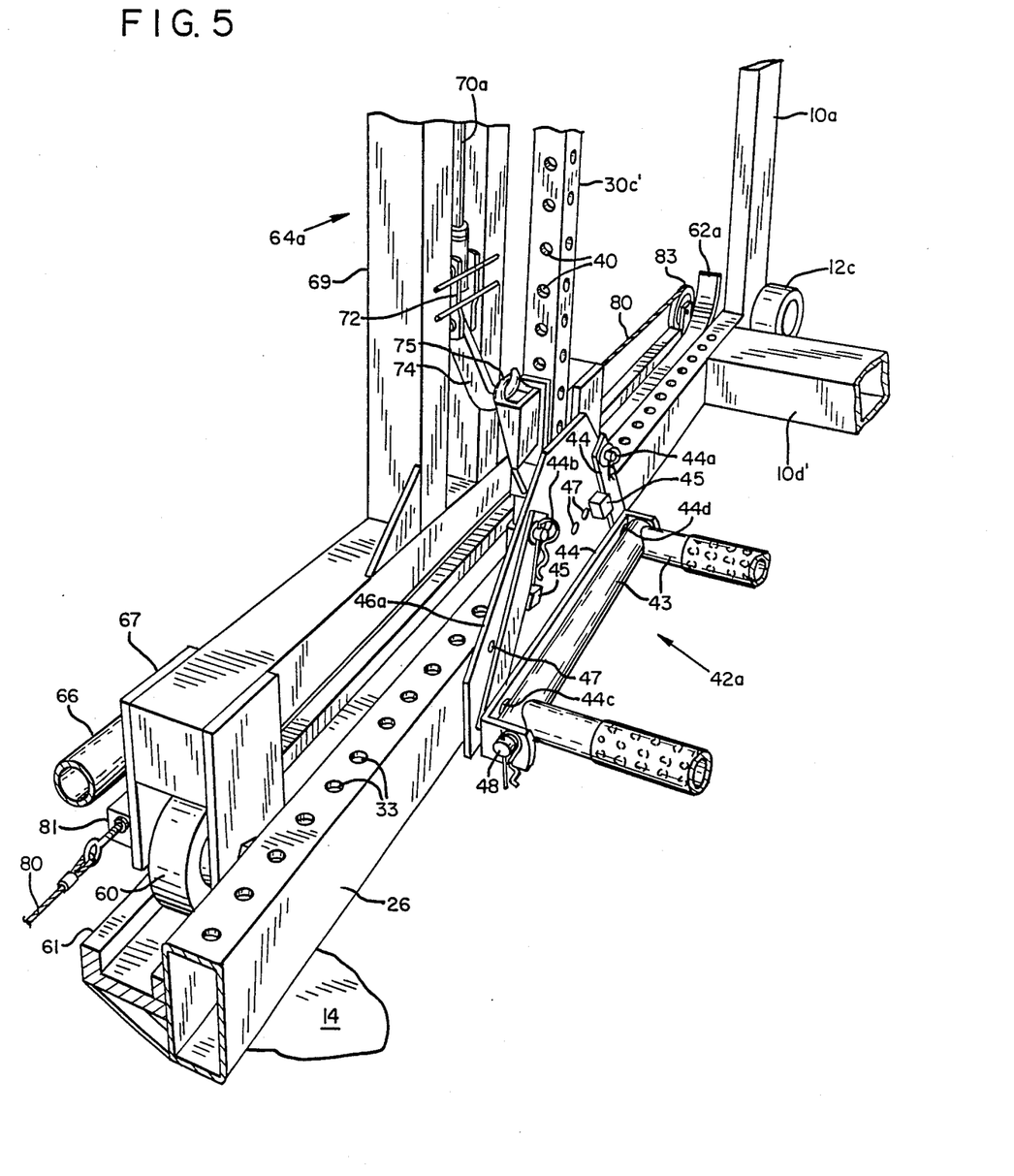
FIG. 5 is an enlarged, perspective, interior view of a portion of the side and end of the frame opposite to the end shown in FIG. 4.

The frame 10 is an elongate, rectilinear structure composed of a pair of transversely-spaced, upright sides 10a and 10b joined together at their ends by respective upper cross members 10c, 10c' and lower cross members 10d, 10d' (FIGS. 4 and 5). The end of the frame to be inserted first into the container, i.e. the end adjacent the end 14a of the trailer, has diagonal cross-bracing 10e for rigidity, while the opposite end of the frame is unobstructed to permit the entry of vehicles. Each side 10a and 10b, respectively, has a top rail 24 and a bottom rail 26 with spaced columns 28 supporting the top rail vertically.

In an alternate embodiment of the frame, shown in FIGS. 12–19, the cross members 10c and 10d are replaced by a pair of doors 100 which enclose that end of the frame which is inserted first into the container 16. The outer margins of the doors 100 are attached to the respective sides 10a and 10b by means of hinges 102 and the inner margins are attached to one another by means of hinges 104. The hinges 102 are located on the inside of the frame and the hinges 104 are located on the outside of the frame. Thus the frame 10 can be moved from the expanded position shown in FIG. 12, where the sides 10a and 10b are separated from one another, to the collapsed position shown in FIG. 14, where the sides are adjacent to one another, by folding the doors together about the hinges 102 and 104.

Figure 15:
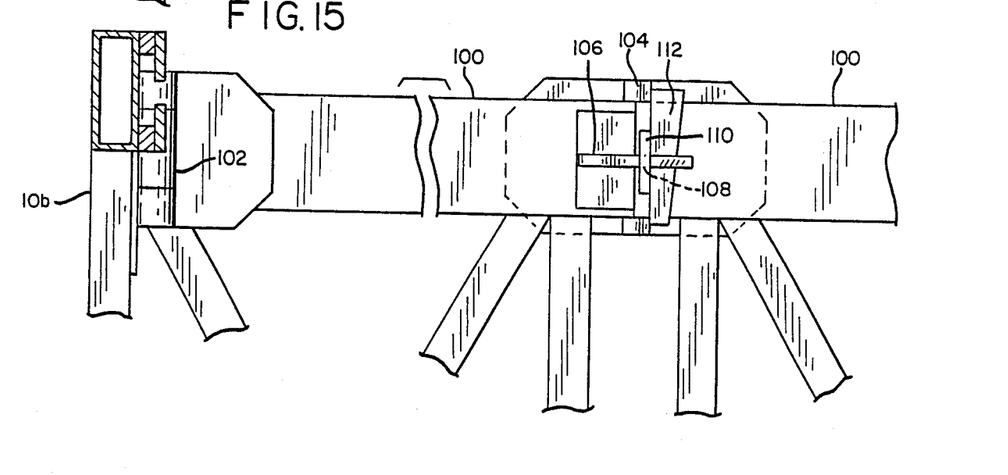
FIG. 15 is a foreshortened, fragmentary sectional view, at an enlarged scale, taken on the lines 15—15 in FIG. 13.
Figure 16:
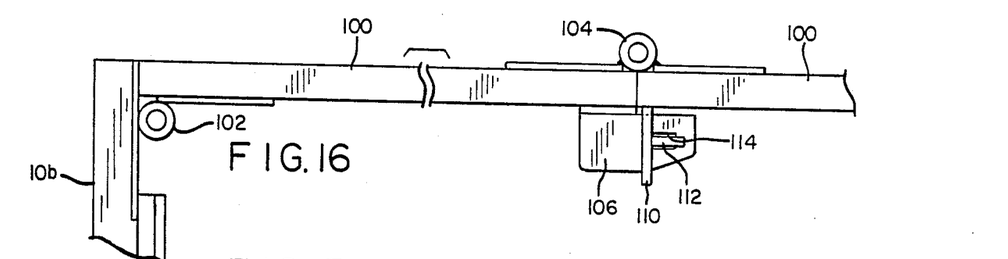
FIG. 16 is a top view corresponding to FIG. 15.
Figure 17:
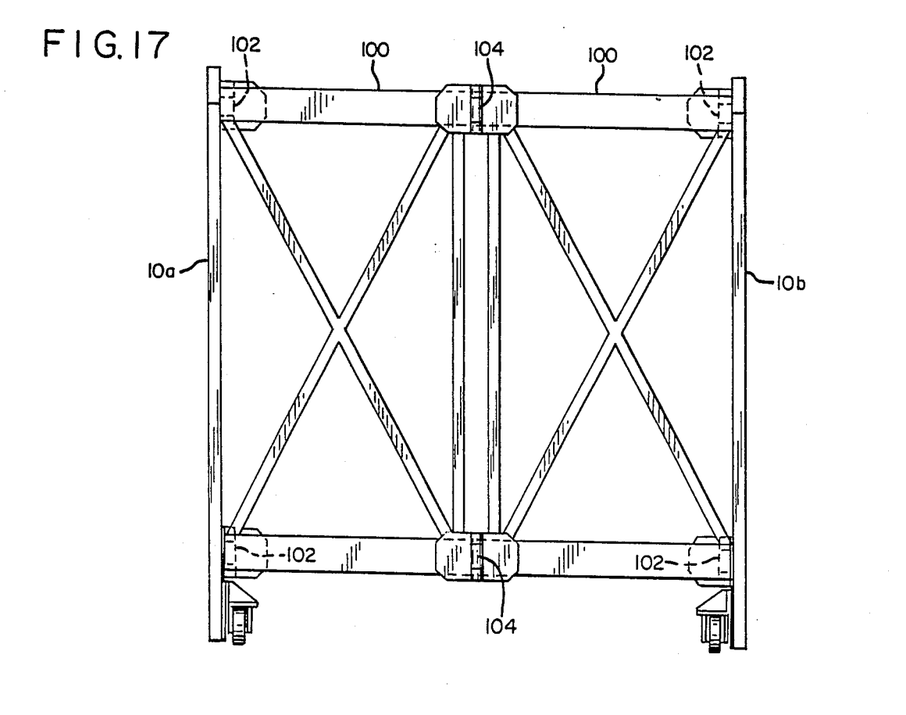
FIG. 17 is an end view of the frame of FIG. 12.
Figure 18:
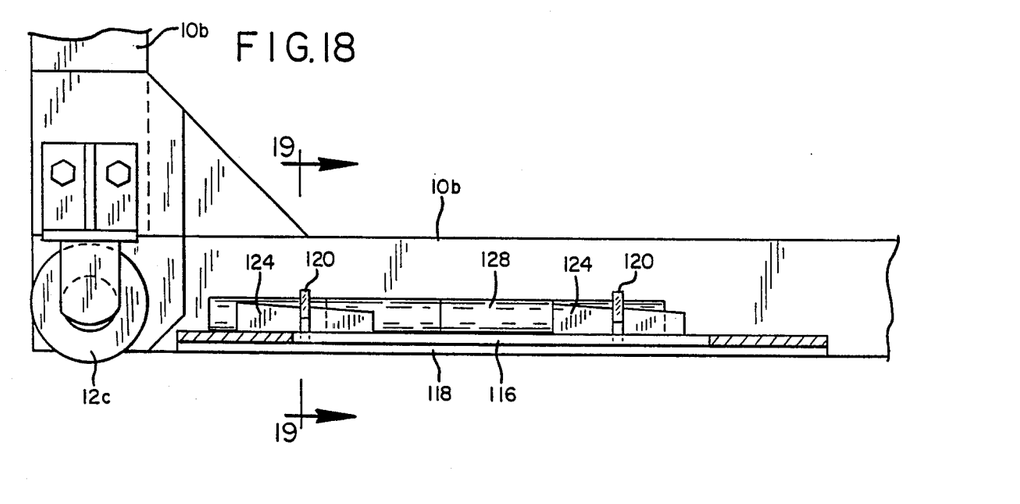
FIG. 18 is a fragmentary sectional view, at an enlarged scale, taken on the line 18—18 of FIG. 12.
Figure 19:
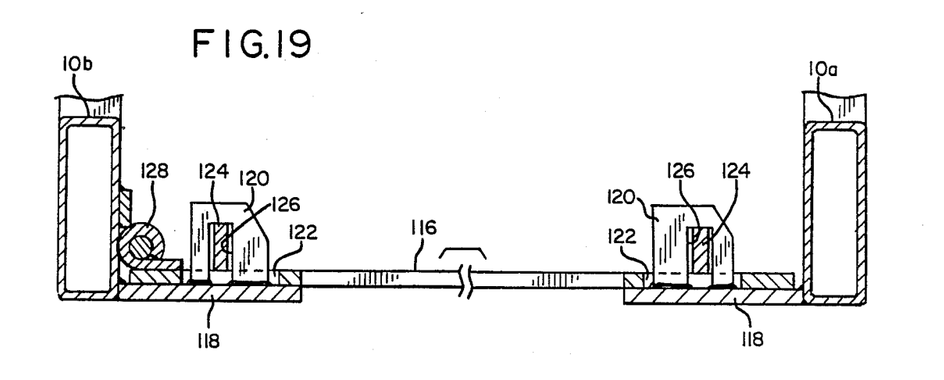
FIG. 19 is a foreshortened sectional view taken on the line 19—19 in FIG. 18.

A tang 106, FIGS. 15 and 16, which extends inwardly from one of the doors, fits through a slot 108 located in a keeper 110 which extends inwardly from the other door when the frame is in its expanded position. A wedge 112 is inserted into a slot 114 in the tang to lock the tang in the keeper and prevent the frame from being moved to its collapsed position.

In this embodiment, the cross members 10c' and 10d' are replaced by a ramp 116 which spans the bottom of the frame. Pads 118, which are attached to the sides 10a and 10b, support the ramp, FIG. 19. Tangs 120 extend upwardly from each pad 118 and pass through slots 122 located in the ramp 116, when the ramp is supported by the pads. Wedges 124, which fit through openings 126 in the tangs, lock the ramp to the pads. Hinges 128 join one end of the ramp to one of the sides 10b. Thus, when the wedges 124 are removed from the openings the ramp can be rotated between the normal operating position shown in FIG. 12 to a raised position shown in FIGS. 13 and 14, thereby permitting the frame to be moved to its collapsed position.

Figures 6, 8, 11:
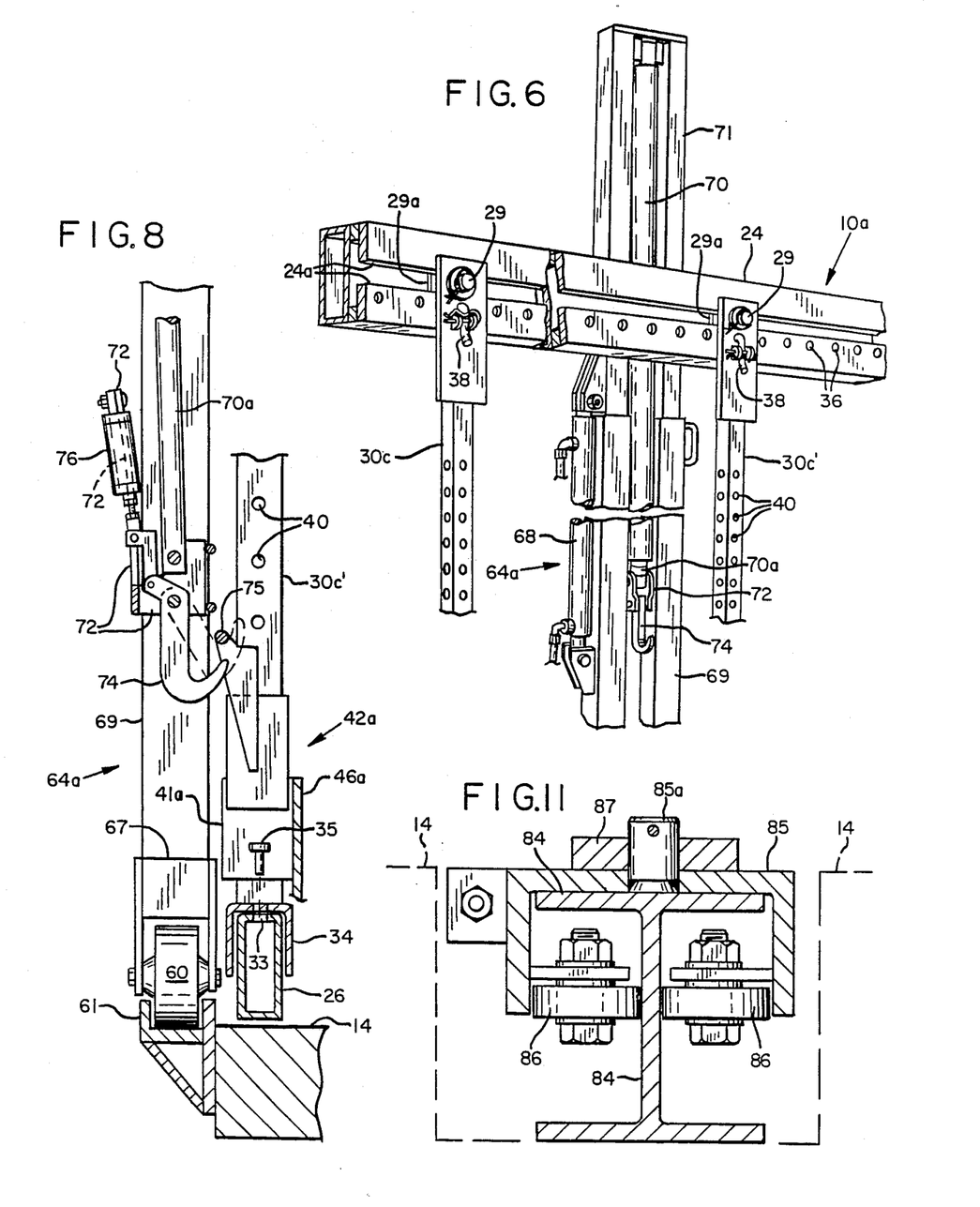
FIG. 6 is an enlarged, extended perspective view of a portion of the top rail of the frame shown in association with a gantry mast and a pair of depending, vehicle-supporting tension members.
FIG. 8 is an enlarged, partially sectional end view of a portion of an upper vehicle wheel support shown in association with a gantry mast.
FIG. 11 is an enlarged sectional view taken along lines 11—11 of FIG. 9.
Figure 7:
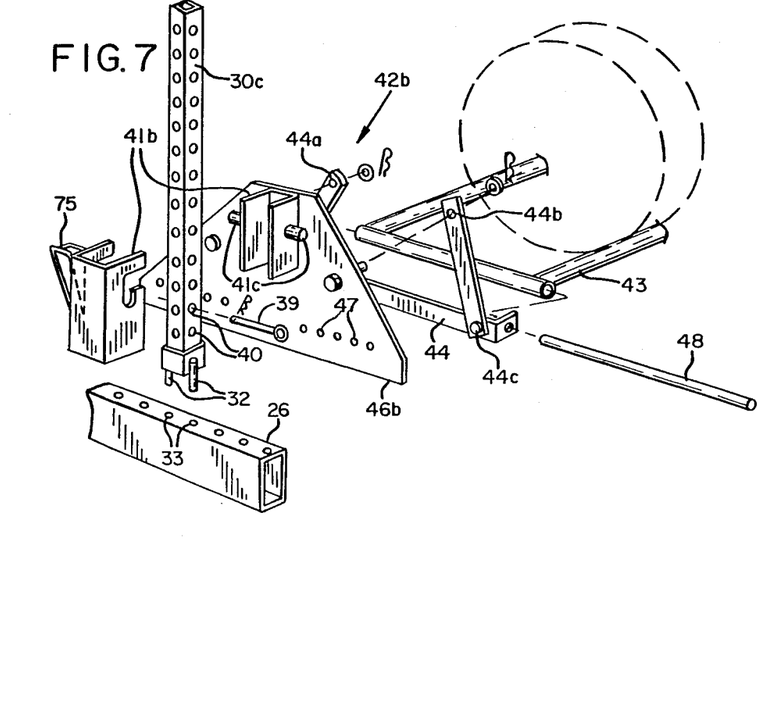
FIG. 7 is an enlarged, exploded perspective view of a lower vehicle wheel support.

Pivotally suspended from each top rail 24 by pins 29 (FIG. 6) mounted on bases 29a slidable within a channel 24a are three pairs of tension members 30a, 30a'; 30b, 30b'; and 30c, 30c'. A greater or lesser number of the tension members could alternatively be provided. One of each pair of tension members, such as member 30c shown in FIG. 7, is pinned at its bottom by pins 32 to apertures 33 in the bottom rail 26 so as to be restrained against movement longitudinally and transversely of the frame. The other tension member of the pair, such as 30c' as shown in FIG. 8, engages the bottom rail 26 by means of a slidable yoke 34 for preventing only transverse movement unless an optional pin such as 35 is inserted. Longitudinal spacing between the tension members of any pair can be adjusted coarsely by the selection of different apertures 36 and 33 in the top and bottom rails, respectively, pins 38 (FIG. 6) being provided for insertion into apertures 36. Fine variation in the spacing is obtainable by virtue of the pivoting pendulum motion of the tension member such as 30c' having the yoke 34 at its bottom.

Vehicle-supporting assemblies are slidably attached to the tension members so as to be vertically movable with respect thereto, each vehicle-supporting assembly comprising either a pair of upper wheel supports such as 42a or a pair of lower wheel supports such as 42b extending transversely between corresponding tension members on each side of the frame. The wheel supports 42a and 42b include elongate, transverse, tubular frames 43 attached by cradle members 44 to vertically-slidable members 46a (for upper wheel supports 42a shown in FIGS. 5 and 8) or 46b (for lower wheel supports 42b shown in FIG. 7). The vertically-slidable members 46a are slidably attached to the tension members by enclosing sleeves 41a, while the members 46b are slidably attached by split-sleeves such as 41b for reasons to be explained hereafter. The sleeves can be locked to the tension members at different elevations by pins such as 39 (FIG. 7) inserted through apertures 40 below the sleeves to prevent downward movement of the wheel supports.

The cradle members 44, due to their pivotal connections 44a, 44b, 44c and 44d, are swingable relative to the members 46a, 46b and thus provide a further degree of fine adjustability of the distance between each pair of wheel supports. Once the vehicle has been raised into its final elevated position, stabilizing blocks 45 (FIG. 5) can be inserted into appropriate apertures 47 in the vertically slidable members of the wheel supports to lock the cradle members 44 against pivoting during transport of the vehicles.

The tubular frames 43 are detachably connected at each end to the cradle members 44 by pins 48 extending through end tubular members of the frames, enabling them to be easily removed when no vehicles are supported by the frame 10 so as to clear the space between the sides 10a, 10b of all obstacles and maximize the space available for other types of cargo.

It can be seen that no structure extends between the wheel-supporting surfaces of an elevated pair of wheel supports, thereby providing free space between the front and rear wheels of the vehicle supported thereon which can be occupied by the upper extremity of the next lower vehicle if necessary. The value of this feature in permitting vehicles to be supported in close vertical proximity to each other is exemplified by the close vertical proximity of vehicles 18a and 18b in FIG. 1.

The Frame-Supporting Assembly

The frame 10 is movably supported atop the frame-supporting trailer 14 by three rollers 12a, 12b and 12c on each bottom rail 26 of the frame 10. During loading of the frame 10 with vehicles, the frame is detachably secured against movement with respect to the trailer 14 by means of a detachable connection between the trailer and an ear 56 (FIG. 10) protruding from the lower frame cross member 10d' in a manner to be described hereafter in detail.

Along the outside longitudinal edges of the trailer 14, exterior of the sides 10a and 10b of the frame, is a gantry assembly 20 mounted for horizontal movement relative to the trailer and frame by means of rollers 60 riding on rails 61 supported by the trailer. Stops 62a and 62b at each end of the rails 61 limit the horizontal travel of the gantry rollers 60. The gantry 20 is composed of two pairs of transversely-spaced masts 64a and 64b, each pair being joined together at their tops by a respective transverse cross member 65 and each pair having separate bases 67 each of which mounts a pair of the rollers 60. The two pairs of masts are longitudinally spaced with respect to each other by a distance which is adjustable by selective actuation of a pair of double-acting hydraulic cylinders 66 extending between the bases 67 of the two pairs of masts. Each mast is preferably of two-stage construction having a lower portion 69 secured to the base 67 and an upper portion 71 vertically slidable relative to the lower portion 69 under the control of a double-acting hydraulic cylinder 68. A further double-acting hydraulic cylinder 70 depends from the upper portion 71 of each mast and has a cylinder rod 70a to the end of which is fastened a frame 72 having a hook 74 pivotally attached thereto for selectively engaging and disengaging any one of the vertically-slidable members 46a or 46b of the vehicle wheel supports 42a or 42b. The sleeve 41a or 41b of each vertically-slidable member of the wheel supports has an outwardly-protruding eye 75 at the top thereof engageable by a respective hook 74 when the hook is pivoted forwardly by the extension of a spring-retracted pneumatic cylinder 76 (FIG. 8) mounted on the frame 72, and disengageable from the hook by retraction of the cylinder 76.

When the eyes 75 of the vertically-slidable members 46a on each end of a particular upper wheel support 42a have been engaged by the hooks 74 of a pair of masts 64a or 64b, the members 46a may be raised upwardly by extension of cylinder 68 and/or retraction of cylinder 70 of each mast to raise the respective wheel support 42a to an elevated position. This raises the front or rear wheels of a motor vehicle supported thereby while the other pair of masts of the gantry 20 likewise raises the wheel support 42a upon which the other wheels of the same vehicle are supported. Each wheel support can be raised by a distance independent of the other wheel support due to the separate controllability of the respective hydraulic cylinders of the two pairs of masts of the gantry, enabling the vehicle to be tilted to any desired attitude to maximize the number of vehicles which can be supported by the frame 10. When the desired elevated positions of the wheel supports are obtained, the aforementioned pins such as 39 (FIG. 7) are inserted through the apertures 40 in the respective tension members immediately below the sleeves 41a by which the members 46a slide vertically on the tension members. Thereafter the hooks 74 can be pivoted rearwardly by retraction of the respective pneumatic cylinders 76 and the masts lowered to disengage the hooks from the eyes 75.

A further vehicle may be supported by the frame 10, immediately below the vehicle which has been elevated as described in the previous paragraph, to form a column of vehicles by slidably attaching a pair of lower wheel supports 42b to the bottoms of the same tension members which support the elevated vehicle, and using the gantry 20 to lift the wheels of the further vehicle clear of the bed of the trailer 14. The only difference between the lower wheel supports 42b and the upper wheel supports 42a is the aforementioned split-sleeve 41b (FIG. 7) which enables the vertically-slidable members 46b to be attached to the tension members laterally from inside the frame 10. The outer portion of each split sleeve carries the hook-engaging eye 75 and lifts the inner portion of the sleeve through lugs 41c when engaged by a respective hook 74.

For positioning a second column of vertically-spaced vehicles in end-to-end relation to a first column, the entire gantry 20 is moved horizontally on the rollers 60 into alignment with a pair of wheel supports 42a on the next pair of tension members, and the foregoing operation is repeated. Horizontal movement of the gantry 20 is accomplished by means of respective cables 80 which extend along each side of the trailer 14 over end idler pulleys 82 and 83 and attach to the respective bases 67 of the pair of masts 64a of the gantry by any suitable fastener such as 81. The cables bypass the bases 67 of the other pair of masts 64b so as to permit spacing adjustment by hydraulic cylinder 66. The cables 80 are wrapped around a pair of sheaves 79 driven in unison by a selectively controllable, reversible hydraulic motor 79a which moves the gantry 20 reversibly in either horizontal direction along the trailer 14.

Figure 9:
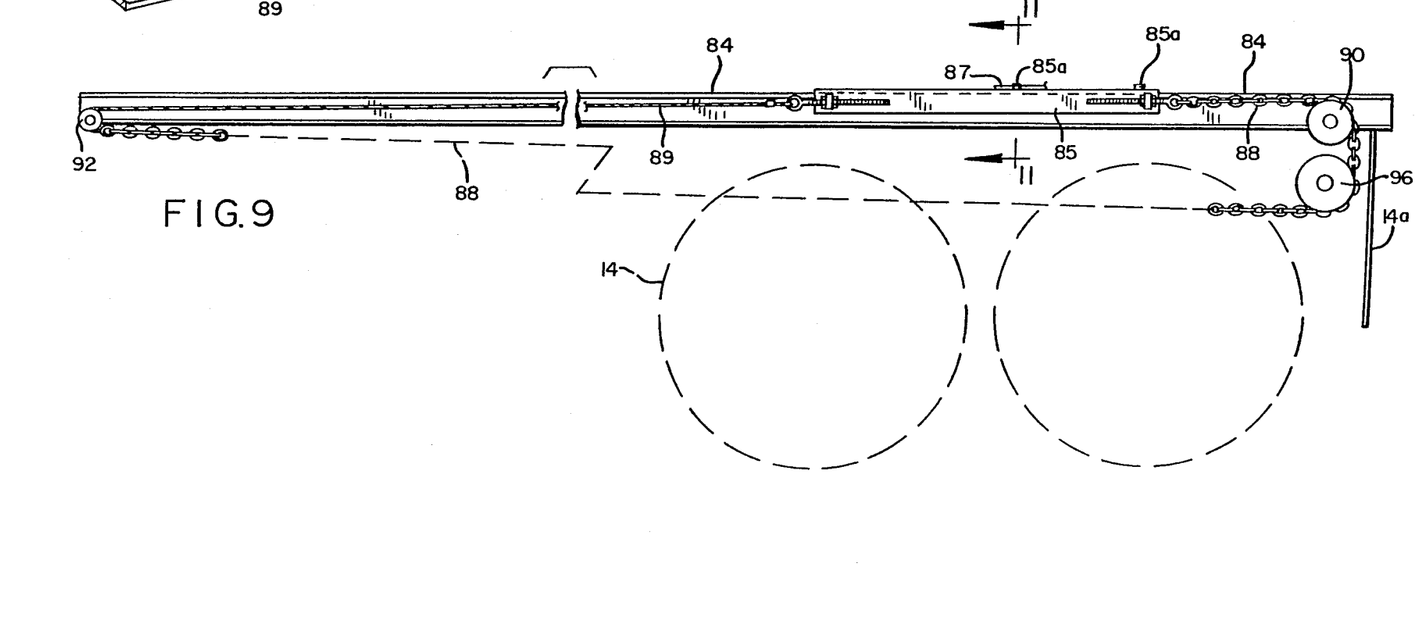
FIG. 9 is an extended side view of the powered carrier assembly on the trailer which selectively inserts or withdraws the frame with respect to the cargo-carrying enclosure.
Figure 10:
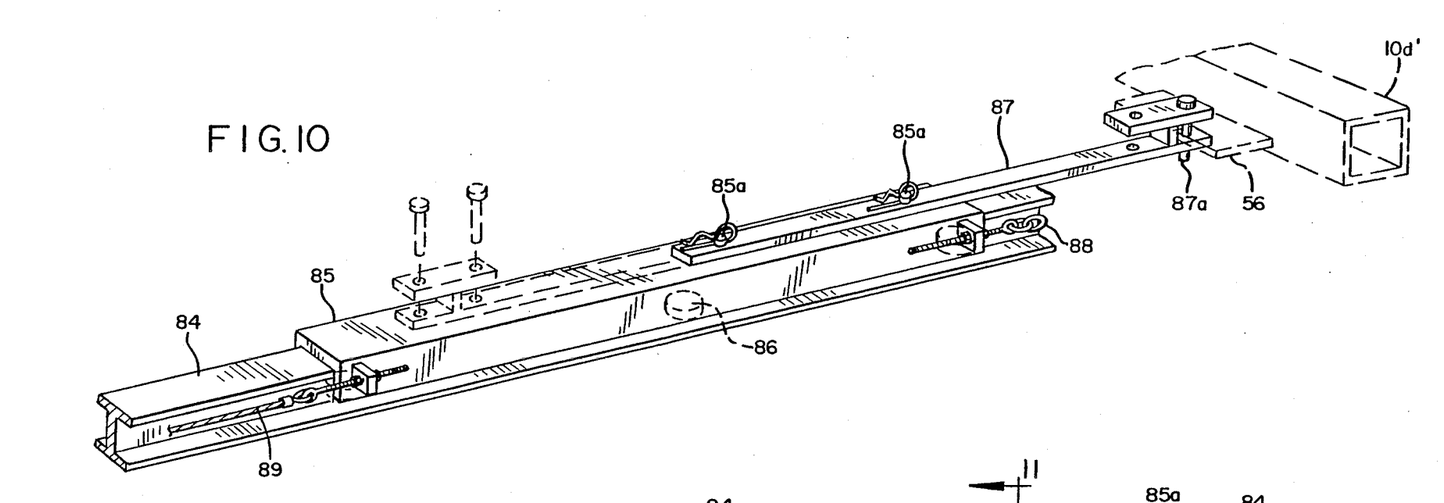
FIG. 10 is an enlarged perspective view of the carrier of FIG. 9 and the tongue by which the carrier attaches to the frame.
Figure 12:
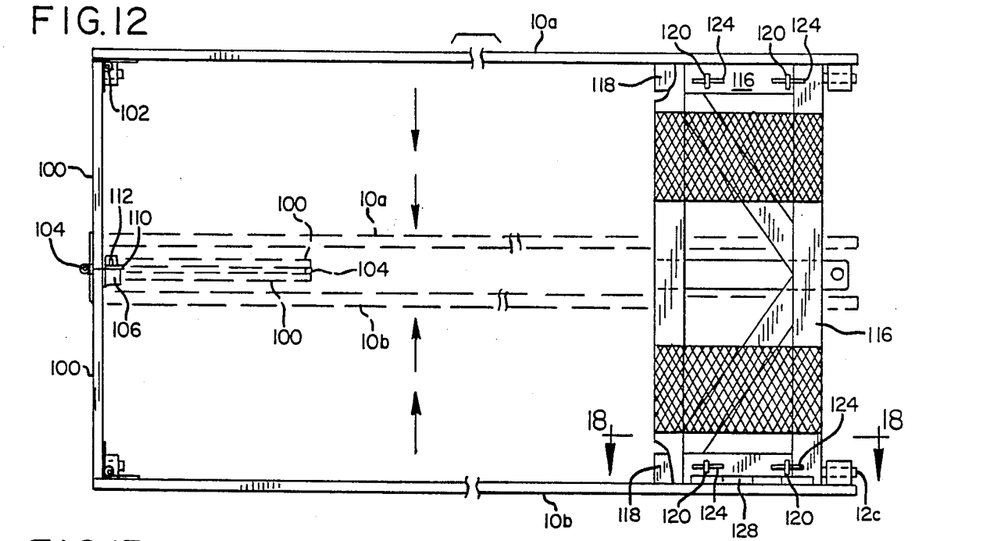
FIG. 12 is a foreshortened top view of another embodiment of the vehicle-carrying frame showing portions thereof in a collapsed position in dashed line.
Figure 13:
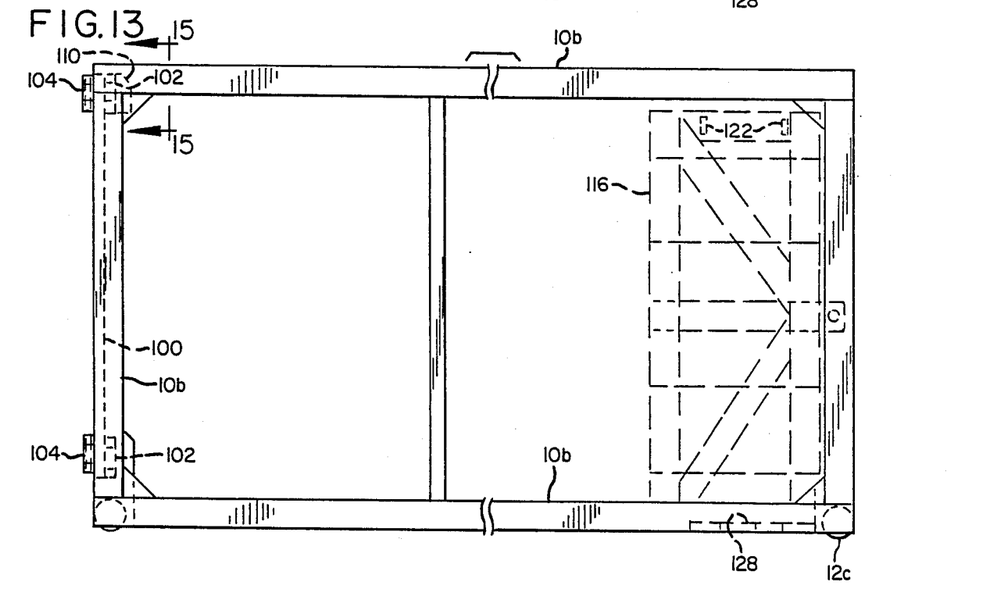
FIG. 13 is a foreshortened side view of the frame of FIG. 12 in its collapsed position.
Figure 14:
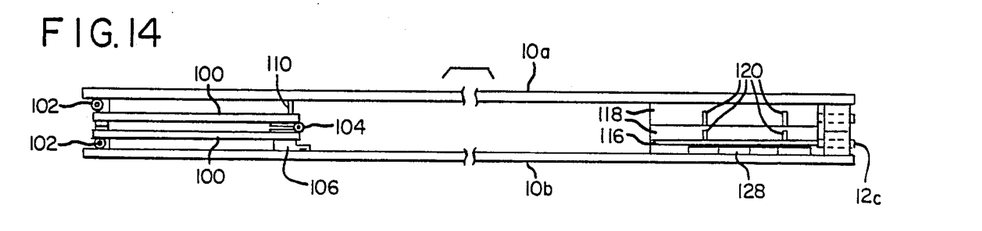
FIG. 14 is a foreshortened view of the frame of FIG. 12 in its collapsed position.

The position of the frame 10 on the trailer 14 is determined by control of a powered carrier 85 (FIGS. 9, 10, 11). The carrier 85 is slidably mounted on a track 84 extending longitudinally along the center of the trailer 14 exposed to the surface of the trailer bed, and is movably secured to the track 84 by roller bearings 86. A tongue 87 detachably engages both the ear 56 of the frame, through a pin 87a, and a pair of lugs 85a on the carrier, and can be positioned reversibly as shown in phantom if needed. A chain 88 is attached to each end of the carrier 85 through respective idler pulleys 90 and 92 at each end of the trailer, and through an intermediate length of cable 89. The chain 88 engages a driving chain pulley 96 driven by another reversible hydraulic motor (not shown) which, when not activated, holds the carrier 85 and thus the frame 10 against movement relative to the trailer 14 during loading of vehicles onto the frame 10. Thereafter, to insert the frame into the container, the hydraulic motor selectively drives the pulley 96 in a clockwise direction as seen in FIG. 9. Alternatively, to withdraw the frame from the container, the pulley 96 is driven in the opposite direction.

All hydraulic and pneumatic cylinders and motors on the trailer 14 are controlled by separate conventional manual control valves (not shown) supplied by fluid or air from any convenient source, such as from a truck tractor through quick-disconnect hose attachments.

Operation

In operation, an empty frame 10 is positioned on the trailer 14 as shown in FIG. 1 by any convenient means. Normally, this would be accomplished by aligning a container 16 with the end 14a of the trailer, the container already having the frame 10 positioned therein from a previous trip, and withdrawing the frame from the container onto the trailer 14. To do so, the carrier 85 is moved by activation of the chain pulley 96 adjacent to the container, and the tongue 87 is attached to the ear 56 of the frame and to the carrier 85 as shown in FIG. 10. The carrier 85, acting through the tongue 87, then pulls the frame from the container to the bed of the trailer by driving of the chain pulley 96 so as to move the carrier 85 away from the container. The frame is loaded with vehicles by driving them, one at a time, up the ramp 11 onto the bed of the trailer between the sides of the frame 10. The first vehicle is driven onto a fully-lowered pair of wheel supports 42a at the end of the frame adjacent to the container, i.e. the supports 42a attached to tension members 30a and 30a' lowered into engagement with the trailer bed, after which the vehicle is raised by the gantry 20 to the desired elevated position where the wheel supports are restrained against downward movement by the insertion of pins 39 through the apertures 40 in the tension members.

Thereafter a lower pair of wheel supports 42b are attached to the same tension members 30a and 30a' in fully lowered positions, and a second vehicle is driven up the ramp 11 and onto the lower wheel supports. The gantry hooks 74 are detached from the upper wheel supports 42a and lowered into engagement with the lower wheel supports 42b to raise the wheels of the lower vehicle above the trailer bed so that the vehicle wheels will not impede the eventual insertion of the frame into the container by contact with the trailer bed. The lower wheel supports are then pinned by further pins 39 to prevent their downward movement.

The next two columns of vertically-spaced vehicles are loaded onto the frame in the same manner, the gantry being moved horizontally into alignment with the next pairs of tension members 30b, b' and 30c, c' in succession to detachably engage, raise and disengage the respective wheel supports. Prior to insertion of the frame into the container, the vehicles are preferably all secured to the wheel supports by conventional tie-down chains (not shown).

With the frame 10 fully loaded with vehicles, and with the gantry 20 fully disengaged from all wheel supports, the carrier 85 is actuated by driving the chain pulley 96 to push the frame 10 into the container 16, transmitting the pushing force through the tongue 87. With the frame fully inserted in the container, the tongue 87 is detached from the frame and from the carrier, and blocking members (not shown) are placed at the bottom of the container at each end of the frame 10 to restrain the lower rails of the frame against longitudinal movement within the container. The container is then closed and taken away for transport.

At the container's destination, a similar trailer 14 with gantry 20 is provided for unloading purposes. Accordingly, the frame with its vehicles is withdrawn from the container by attachment of the tongue 87 to the frame 10 and carrier 85 in the manner previously described, followed by withdrawal of the frame from the container. To unload the vehicles, the gantry operates on each vehicle in the reverse of the order in which it was loaded, raising the respective wheel supports momentarily to withdraw the pins 39 and then lowering them completely so that the vehicle can be driven off the trailer bed.

After unloading is completed, the remaining wheel supports still attached to the tension members of the frame may have their transverse tubular frames 43 detached by removal of pins 48, after which the empty frame 10 may be reinserted into the container. The interior of the container is then virtually empty except for the surrounding shell of the frame, and may be loaded conventionally with other cargo for the return trip. The fact that the sides 10a, 10b of the frame 10 mate in close proximity to the sides of the container maximizes the capacity of the container for the other cargo.

With the embodiment illustrated in FIGS. 12-19, several of the empty frames can be transported at the same time by collapsing them. This is accomplished by removing the wedges 124 from the tangs 120 and raising the ramp 116 about the hinges 128. The wedges 112 are then removed from the tangs 106 and the sides 10a and 10b are moved together causing the doors 100 to fold about hinges 102 and 104.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for transporting wheeled vehicles in an enclosure, comprising:
    (a) a cargo-carrying enclosure of elongate shape having a pair of transversely-spaced upright sides;
    (b) an elongate, vehicle-supporting frame selectively insertable into said enclosure, said frame having vehicle-supporting means on at least a portion thereof for supporting a plurality of wheeled vehicles, one above the other, in vertically-spaced relation to each other when said portion of said frame is exterior of said enclosure, and further having a pair of transversely-spaced upright sides for vertically-supporting said vehicle-supporting means, the sides of said frame being transversely spaced so as to fit matingly between, and in close proximity to, the sides of said enclosure, said frame including transverse means for normally maintaining the sides of said frame in the correct separation to fit matingly in said enclosure; and
    (c) means for collapsing said frame such that the sides thereof are in close proximity to one another, said means for collapsing including hinged joints between said transverse means and the sides of said frame, said transverse means including a pair of doors which cover one of the ends of said frame, one of said hinged joints attaching each of said doors to a respective side of said frame and one of said hinged joints attaching said doors to one another.

2. Apparatus for transporting wheeled vehicles in an enclosure comprising:
    (a) an elongate, vehicle-supporting frame having a pair of transversely spaced, elongate upright sides separated by a distance and a pair of ends defining an interior space capable of enclosing a plurality of wheeled vehicles in respective upper and lower positions vertically spaced one above the other;
    (b) respective upper and lower vehicle supports connected to said sides of said frame for supporting said vehicles in said upper and lower positions, respectively, in a condition physically isolated from one another, said upper and lower vehicle supports extending transversely between said sides so as to maintain at least a predetermined distance between said sides;
    (c) means for detachably connecting said upper and lower vehicle supports to said sides; and
    (d) structural means independent of said upper and lower vehicle supports for normally maintaining at least said predetermined distance between said sides, said structural means including means movably connected to said sides for enabling the distance between said sides to be selectively decreased to a distance less than said predetermined distance when said vehicle supports are detached from said sides.

3. The apparatus of claim 2, further including means associated with said structural means for selectively locking said structural means against movement with respect to said sides for maintaining at least said predetermined distance between said sides, and for selectively unlocking said structural means for enabling said movement.

4. The apparatus of claim 2 wherein said structural means comprises means hingedly connected to said sides for pivoting with respect to said sides into said interior space.

5. A method of loading wheeled vehicles into an elongate enclosure for transport therein comprising:
    (a) providing an elongate, vehicle-supporting frame having a pair of transversly spaced, elongate upright sides separated by a distance, said sides defining an interior space capable of enclosing a plurality of wheeled vehicles in respective upper and lower positions vertically spaced one above the other;
    (b) positioning at least a portion of said frame exterior of said enclosure;
    (c) while said portion of said frame is exterior of said enclosure, supporting said wheeled vehicles in said respective upper and lower positions on said frame within said interior space in a condition physically isolated from one another;
    (d) inserting said portion of said frame longitudinally into said enclosure while said vehicles are supported by said frame in said respective upper and lower positions; and
    (e) prior to step (c) increasing the distance between said upright sides.

6. A method of unloading wheeled vehicles from an elongate enclosure comprising:
    (a) providing an elongate, vehicle-supporting frame within said enclosure having a pair of transversely spaced, elongate upright sides separated by a distance, said sides defining an interior space and supporting a plurality of wheeled vehicles in respective upper and lower positions vertically spaced one above the other within said interior space in a condition physically isolated from one another;
    (b) withdrawing at least a portion of said frame to a position exterior of said enclosure;
    (c) while said portion of said frame is exterior of said enclosure, removing said wheeled vehicles from said respective upper and lower positions within said interior space; and
    (d) thereafter decreasing the distance between said upright sides.

* * * * *